United States Patent
Harshbarger et al.

(10) Patent No.: US 10,617,108 B2
(45) Date of Patent: Apr. 14, 2020

(54) BEADER FOR MOUNTING BEADS ON FISHING HOOKS AND METHODS ASSOCIATED THEREWITH

(71) Applicants: Timothy Harshbarger, Winston-Salem, NC (US); Todd Cassidy, Mocksville, NC (US); Mark Martel, Belews Creek, NC (US); Philip Morrison Allred, III, Kernersville, NC (US)

(72) Inventors: Timothy Harshbarger, Winston-Salem, NC (US); Todd Cassidy, Mocksville, NC (US); Mark Martel, Belews Creek, NC (US); Philip Morrison Allred, III, Kernersville, NC (US)

( * ) Notice: Subject to any disclaimer, the term of this patent is extended or adjusted under 35 U.S.C. 154(b) by 263 days.

(21) Appl. No.: 15/514,512

(22) PCT Filed: Sep. 25, 2015

(86) PCT No.: PCT/US2015/052173
§ 371 (c)(1),
(2) Date: Mar. 25, 2017

(87) PCT Pub. No.: WO2016/049427
PCT Pub. Date: Mar. 31, 2016

(65) Prior Publication Data
US 2017/0273289 A1 Sep. 28, 2017

Related U.S. Application Data

(60) Provisional application No. 62/056,108, filed on Sep. 26, 2014.

(51) Int. Cl.
*A01K 97/26* (2006.01)
*A01K 97/06* (2006.01)
*A01K 99/00* (2006.01)

(52) U.S. Cl.
CPC .............. *A01K 97/26* (2013.01); *A01K 97/06* (2013.01); *A01K 99/00* (2013.01)

(58) Field of Classification Search
CPC ......... A01K 97/26; A01K 97/06; A01K 99/00
(Continued)

(56) References Cited

U.S. PATENT DOCUMENTS

| 1,335,805 | A | * | 4/1920 | Trueb | ........................ | D04D 9/00 |
| | | | | | | 223/48 |
| 2,763,956 | A | * | 9/1956 | Olson | ..................... | A01K 97/04 |
| | | | | | | 206/535 |

(Continued)

*Primary Examiner* — Christopher P Ellis
(74) *Attorney, Agent, or Firm* — Ben Schroeder Law, PLLC (57) ABSTRACT

The present invention relates to a device that facilitates the mounting of beads onto a fishing hook, such as a fly fishing hook. In one embodiment, the device may have a storage chamber and one or more of a loading access tip, a bead loading hole and/or a beading access tip. In some devices, the one or more of a loading access tip, a bead loading hole and/or a beading access tip may be combined. In an embodiment, the loading access tip, bead loading hole, or beading access tip allows the loading of the beads into the device. The bead loading hole and the beading access tip facilitates the beading of a fishing hook. The device(s) may further have one or more of slits or holes to facilitate the beading of the fishing hooks.

14 Claims, 8 Drawing Sheets

(58) Field of Classification Search
USPC .......................................................... 43/42.32
See application file for complete search history.

(56) References Cited

U.S. PATENT DOCUMENTS

| | | | | | |
|---|---|---|---|---|---|
| 2,893,599 | A * | 7/1959 | Kay | ................... | B65D 83/0409 221/197 |
| 3,412,897 | A * | 11/1968 | Slater | ................... | A63B 57/20 221/226 |
| 3,879,981 | A * | 4/1975 | Richards | ............... | H01R 43/042 140/93 D |
| 4,071,948 | A * | 2/1978 | Deutzmann | ........... | B23P 19/004 221/310 |
| 4,403,497 | A * | 9/1983 | Matteucci | ................ | B21D 5/16 72/409.16 |
| 4,428,146 | A * | 1/1984 | Walker | ................... | A01K 97/04 43/55 |
| 4,502,612 | A * | 3/1985 | Morrison | ............. | B65D 63/109 206/540 |
| 4,564,125 | A * | 1/1986 | Esslinger | .............. | F42B 39/002 124/45 |
| 4,573,718 | A * | 3/1986 | Stiver | ................... | A01K 97/26 289/17 |
| 4,583,315 | A * | 4/1986 | Schreck | ................. | A01K 89/00 43/54.1 |
| 4,648,529 | A * | 3/1987 | Blakemore | ........... | B65D 81/22 210/803 |
| 4,796,318 | A * | 1/1989 | Bigej | ..................... | A01K 95/02 7/106 |
| 4,874,348 | A * | 10/1989 | Lafreniere | ............... | G07D 1/08 453/50 |
| 5,386,658 | A * | 2/1995 | Ferguson | ............... | A01K 97/26 43/42.25 |
| 5,855,048 | A * | 1/1999 | Synowicki | ........... | A44C 17/043 29/10 |
| 5,884,954 | A * | 3/1999 | Trozera | ................. | A01K 97/26 294/100 |
| 6,533,151 | B1 * | 3/2003 | Link | ..................... | A01K 97/06 206/315.11 |
| 6,941,628 | B1 * | 9/2005 | Silverfox | ............... | A01K 85/00 140/121 |
| 7,360,669 | B2 * | 4/2008 | Drajan | ............... | B65D 83/0409 221/208 |
| 7,559,436 | B2 * | 7/2009 | Bieger | ................... | G07F 11/44 221/256 |
| 8,635,805 | B1 * | 1/2014 | Schmunk | ............... | A01K 97/04 206/540 |
| 10,212,925 | B2 * | 2/2019 | Cochran | ................ | A01K 91/06 |

\* cited by examiner

BEADER FOR MOUNTING BEADS ON FISHING HOOKS AND METHODS ASSOCIATED THEREWITH

The present invention claims priority under 35 USC 371 to PCT application No. PCT/US15/52173 filed Sep. 25, 2015 which in turn claims priority under 35 USC 119(e) to U.S. Provisional Application No. 62/056,108 filed Sep. 26, 2014, the entire contents of which are incorporated by reference in their entireties.

FIELD OF THE INVENTION

In one embodiment, the present invention relates to a device for the mounting of beads to fishing hooks. In one embodiment, the present invention relates to the mounting of plastic or metal beads to fishing hooks using the device of the invention. In a variation, the present invention relates to the device and/or the mounting of beads which may be used in the process of producing fishing flies.

BACKGROUND OF THE INVENTION

Fly tiers, both amateur and professional, commonly incorporate colored plastic and/or metal beads in their fly tying patterns for the purpose of providing weight, color, flash, and fly body segmentation to improve the attractiveness and realism of their flies to the fish they pursue. Beads have also been used in other types of fishing, such as for example, the use of beads in fishing for halibut or fishing using gear such as a Carolina Rig.

Originally, fly tier's used their fingers to select, manipulate, position, and mount beads on hooks. However, the small size of the bead(s), generally in a range of about 5/64" to 3/16", the small size of the hook, generally in a range of size 2 to 24, and the need to position the bead(s) properly in relation to the hook point make it very difficult to apply the bead(s) to the hook without dropping the bead(s) or sticking the hook point in the tier's finger. Moreover, the small size of the beads also means that the tier spends long periods of time beading the hook (which takes time away from the enjoyment of fly tying and fly fishing). Beading becomes increasingly difficult as the size of both the bead and the hook decrease. In fact, mounting the bead(s) to a fishing hook is probably the most difficult step in producing a fishing fly. In addition, beads are commonly shipped loose in small plastic bags making the storage, selection, handling and mounting of the bead on the hook difficult for the tier. Bead(s) generally is/are counter drilled on one side to enable the bead(s) to slip over the hook barb and hook bend but because of the incredibly small size of beads, the need to mount the bead on the non-counter drilled side of the bead first makes the incorporation of beads on to a hook extraordinarily difficult.

The process of tying a fly that incorporates a bead begins with the selection of the hook size and corresponding bead size. In most cases the size of the hook is dictated by the size and type of forage prey the fly is being tied to imitate. For instance a fly calling for a size 16 hook would typically require a 5/64" to 7/64" bead (hooks used for tying flies are numbered according to the size of the hook gap and the larger the number the smaller the hook). Once the bead is mounted on the hook is placed in a tying vise and the remaining materials are added to complete the fly.

Thereafter, tiers focused on the storage of the beads creating a number of containers to make finding and selecting a particular bead somewhat easier while still requiring the tier to select, manipulate and mount the bead using their fingers.

A few tiers and/or inventors have developed methods and/or tools for mounting beads on fishing hooks. One method relies on the application of wax to the tier's finger for the purpose of creating an adhesive surface on the tier's finger to enable the tier to more easily pick up a bead. However, this method requires the continuous application of wax to the tier's finger and does nothing to improve the manipulation of the bead to the position required to mount it on the hook or protect the tiers fingers from the point of the hook. In addition, this method requires that the tier clean the wax off the finger before proceeding with rest of the tying steps. A second method relies on the use of a sewing needle or bodkin to pick up the bead and align it with the hook point. However, this method requires the tier to find the correct side of the bead to insert the needle or bodkin into prior to picking up the bead, results in numerous dropped beads as the beads easily slide off the needle or bodkin, and still requires the tier to use their fingers to manipulate the bead over the hook barb and bend resulting in injury to the tier's fingers and dropped beads. A third method, known as the hook dipping method is used with glass or straight-hole metal beads. This method uses a clear plastic container.

Some tiers have resorted to using self-closing tweezers, designed for other uses, to pick up, position and mount a bead to a hook. Some tiers have coated the points of their tweezers with various adhesives to improve the cohesion of the bead to the jaws of the tweezers. These tweezers work best with a plastic plate or bead dispenser since the bead must be exactly positioned prior to picking up the bead so that the hole in the bead is not covered by the jaws of the tweezers. If adhesive is present on the end of the tweezers, sometimes this adhesive may stick with the beads, meaning that beads that have been incorporated into a hook have adhesive on them. In applications where adhesive is not used, beads that are not perfectly centered in the jaws of the tweezers have a tendency to spring out of the tweezers if too much pressure is applied to the handles of the tweezers during the process.

The Jade River Bead Nabber is essentially a self-opening tweezer with small indentations or depressions in the tip of the tweezers that aid in the capture and position of the beads. The Jade River Bead Nabber is equipped with a side locking mechanism that can be activated once a bead has been captured to help ensure the bead is not dropped if finger pressure is decreased.

Although the above devices provide some advantages relative to situations where just the human hand is used, all of the methods and devices heretofore known suffer from a number of disadvantages.

These disadvantages include:

(a) Bead(s) must be in a specific orientation prior to picking up the bead. If they are not in this orientation, the tier must take the time to orient the bead into the proper position leading to slow addition of the beads to hooks.

(b) Many devices are not specifically designed for this use and thus, have drawbacks like squeezing beads, which leads to beads being ejected from the devices, and bead loss.

(c) The devices generally do not lessen the risk of injury to the tier's fingers as the tier must make sure that the bead stays in the same orientation and one hand is constantly occupied with applying the correct pressure to maintain the bead in the correct orientation while the other hand must manipulate the hook point to align it with the hole in the bead.

(d) The devices are only able to hold one bead at a time, which means slower beading.

(e) The devices generally do not work well when the bead size is small as they tend to cover the hole in the bead through which the hook point must pass.

(f) The devices do not combine storage, selection, manipulation, alignment, and mounting.

It is with these limitations of the prior art that the present invention was developed.

OBJECTS AND ADVANTAGES

Accordingly, several objects and advantages of our invention are:

(a) to provide a device that provides a superior method for mounting a bead on a fishing hook;

(b) to provide a device that reduces the number of dropped and lost beads;

(c) to provide a device that can be easily labeled to identify both bead size and bead color;

(d) to provide a device that stores, positions, and holds the bead to ease the mounting of the bead onto a fishing hook;

(e) to provide a device that streamlines the bead mounting process by eliminating a number of steps from the mounting process;

(f) to provide a device that reduces the likelihood of injury to a tier's finger during the bead mounting process;

(g) to provide a device that can accommodate the full range of bead and hook sizes available to create fishing flies.

Further objects and advantages are to provide a device which can be used easily and conveniently to store, position and manipulate beads onto fishing hooks, without dropping the bead and/or injuring the tier's finger. The device(s) of the present invention is/are simpler to use and inexpensive to manufacture. The device(s) of the present invention may allow those tiers that have arthritis, diminished eye sight and/or disabilities like carpel tunnel syndrome to be able to mount beads on hooks. In some embodiments, the device(s) of the present invention may be supplied pre-load with beads and may come as kits. Still, further objects and advantages will become apparent from a consideration of the ensuing description and drawings.

SUMMARY OF THE INVENTION

The present invention relates to a device for the mounting of beads to fishing hooks. In an embodiment, the present invention relates to the mounting of plastic, glass or metal beads to fishing hooks using the device of the invention. In a variation, the present invention relates to the device and/or methods associated with the mounting of beads on fishing hooks, which may be used in the process of producing fishing flies.

DETAILED DESCRIPTION OF THE INVENTION

In several embodiments, the present invention relates to beaders that have the advantages enumerated above. Although the invention will be described with respect to the drawings, it should be understood that modifications can be made to the present invention that are within the scope of the invention.

Figure 1:
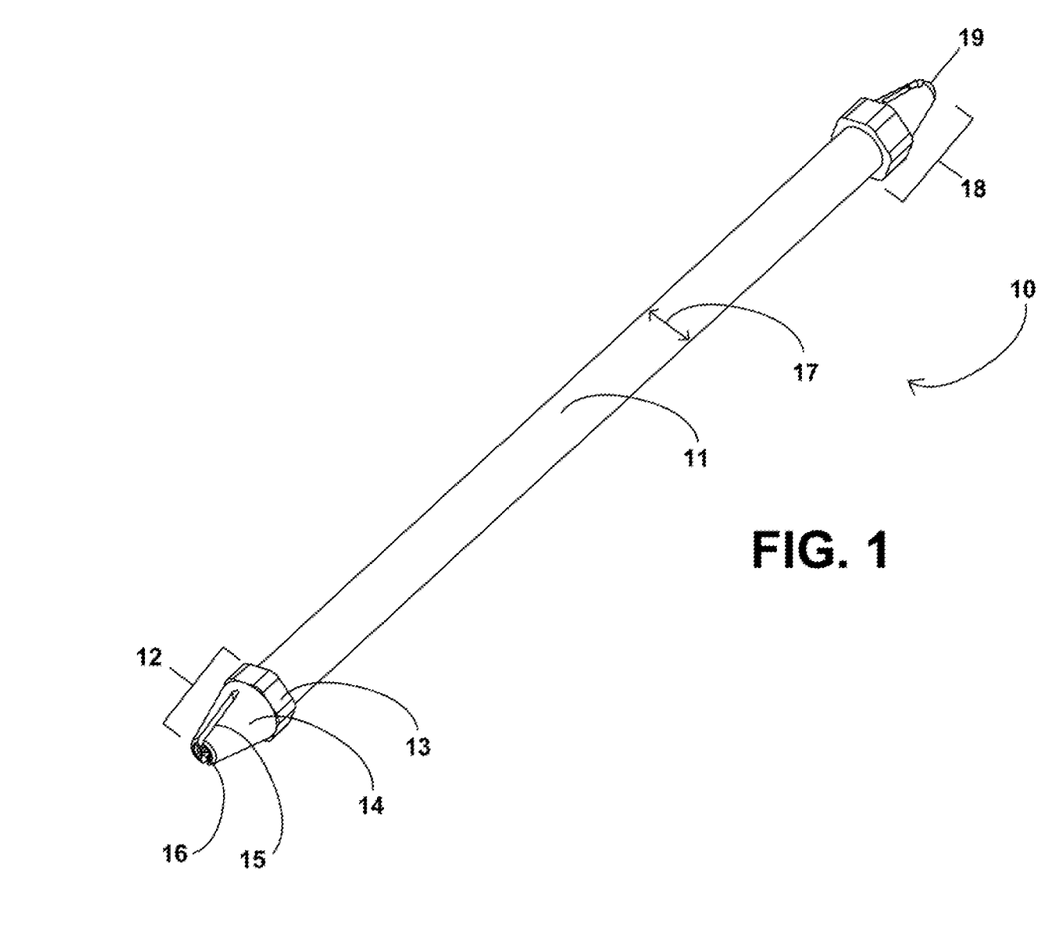
FIG. 1 shows a perspective view of one of the beading devices of the present invention.

In FIG. 1, the device 10 is shown that has a storage chamber 11 and two tips, a loading access tip 12, and a beading access tip 18. The storage chamber 11 is defined by an inner diameter 17 with the loading access tip 12 and the beading access tip 18 being on separate ends of the storage chamber 11. The loading access tip 12 has a loading access hole 16 at the end of conical unit 14, and conical unit 14 has at least one slit 15, and may optionally have one or more additional slits. In one embodiment, there may be one slit 15 and a second slit that may be positioned 180 degrees from slit 15 (the second slit is not shown in FIG. 1 but can be seen in FIGS. 3A and 6A). The loading access tip 12 and the beading access tip 18 may also have attachment point 13 that allows the attachment of the loading access tip 12 and the beading access tip 18 to storage chamber 11. Storage chamber 11 is hollow on the inside allowing the beads to be present inside of the storage chamber. This can be seen for example, in FIG. 6B.

Access hole 16 is of a diameter that is slightly smaller than the bead that the device 10 is designed to accommodate. The presence of slit 15 and a second slit (not shown in FIG. 1) allows access hole 16 to vary slightly in its diameter size when the device 10 is held in a vertical position and a bead is picked up by loading access tip 12 (e.g., there is a little flex that allows the diameter size of the access hole 16 to change slightly). In an embodiment, to pick up a bead that is on a flat hard surface, the user holds device 10 in a vertical position with the loading access tip 12 down and the beading access tip 18 up. The loading access tip 12 is positioned so that the access hole 16 is positioned above the bead. The user then presses the device down making sure that the bead stays at a position below the access hole 16. The force on the access hole 16 by the bead causes a slight expansion in the diameter of the access hole 16, allowing the bead to enter into the conical unit 14. For example, if a user desires to pick up a bead that is 5/64" in size, the size of the access hole 16 may be 1/16" in size (i.e., 4/64"). When one depresses the access hole 16 on to the bead, the access hole 16 expands to a size that is 5/64" or greater in size allowing the 5/64" in size bead to be picked up. After the bead has been picked up so that is in the interior of the device 10, the access hole 16 returns to its size prior to expansion (for example, 1/16") so that the bead does not fall out of the interior of the device 10.

The bead, which has been picked up, is present in the interior of conical unit 14 and changing the orientation of the device 10 from a vertical position to a horizontal position (and beyond horizontal so that the beading access tip 18 is at a position lower than the loading access tip 12) will allow the bead to be passed through the interior of the conical device 14 down into the storage chamber 11 to a position that is at the beading access tip 18.

It is at the beading access tip 18 where the bead can be mounted on a fishing hook. This process will be described in more detail in the description as it relates to FIG. 2.

It should be noted that the device can be any of a plurality of materials that are able to accommodate this process. For example, in an embodiment, the device 10 is constructed from a hollow metal tube, such as copper. However, the device may be constructed of any material, such as polyethylene, polypropylene, steel, brass, various alloys, various plastics, various metals, various hard rubbers, wood and the like. In an embodiment, the device is a material that has sufficient properties so that it can allow the mounting of beads on a fishing hook. For example, the access hole 16 (with slit 15 and optionally, a second slit) has to have sufficient flexibility to allow passage of a bead into the interior of the device 10. The device 10 should also have sufficient structural stability so that the beads will remain stored in the device 10 and will not easily fall out of the device.

It should be understood that although the device 10 is shown with a loading access tip 12, other means of getting the beads into the interior of device 10 are contemplated. For example, the end containing the loading access tip may not have a tip at all, allowing beads to be placed into the interior of the device. Alternatively, other contemplated means of delivering beads into the interior of the device may include funnels, flaps, flanges, a hole that is slightly larger than the bead to be delivered, or in other ways.

Attachment point 13 is a part of the loading access tip 12 or the beading access tip 18. The attachment point 13 is what allows the loading access tip 12 or the beading access tip 18 to be attached to the storage chamber 11 and held in place by friction. A plurality of mechanisms by which attachment may occur are contemplated. If the attachment point and the storage chamber is metal, it may be soldered. Alternatively, the outer diameter of the storage chamber 11 may fit snugly inside the attachment point allowing the loading access tip 12 or the beading access tip 18 to be placed on the storage chamber 11. Alternatively, irrespective of the materials that make up the attachment point 13 and the storage chamber 11, there may be threads present which allow the loading access tip 12 or the beading access tip 18 to be screwed on to the storage chamber 11. Other means of attaching the tips such as glues or epoxies may be used. It is also contemplated that the device 10 may be manufactured as a single piece so that no attachment is necessary.

The inner diameter 17 of the interior of the storage chamber 11, in one embodiment, is a size that is ideally suited to accommodate the beads. In one embodiment, the inner diameter 17 of the interior of the storage chamber 11 is not so little that the beads may not traverse the length of the storage chamber 11 but not so large that any one section of the inner diameter 17 of the interior of the storage chamber 11 is able to accommodate a plurality of beads (i.e., the inner diameter 17 is barely larger than the diameter of a bead so that there is insufficient room for one bead to pass another bead on the interior of the storage chamber 11). In another embodiment, the inner diameter 17 of the interior of the storage chamber 11 is much larger so as to accommodate a very large plurality of beads.

Figure 2:
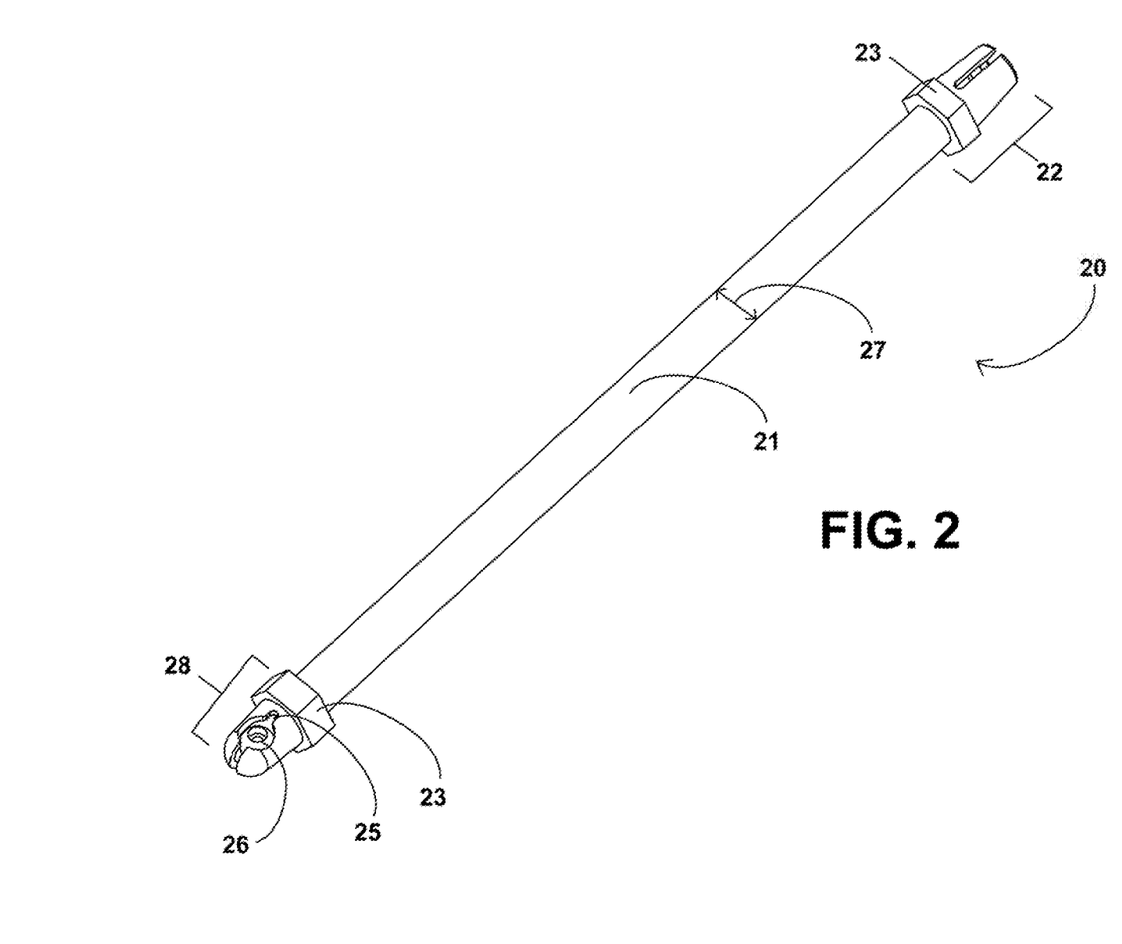
FIG. 2 shows a perspective view of one of the beading devices of the present invention.

FIG. 2 shows a perspective drawing of another embodiment of device 20. In FIG. 2, the loading access tip 22 and the beading access tip 28 are connected to storage chamber 21. Beading access tip 28 has a slit 25 that has a narrower portion of the slit and a broader portion of the slit that creates a tip hole 26. The slit allows a user to access bead through tip hole 26 with a hook. The slit 25 in the narrow part is generally wide enough so that the hook can also access a bead hole through the narrow part. The tip hole 26 of the slit 25 is the correct size so that a hook can readily access the bead through tip hole 26 yet also allows one to remove a bead through the tip hole 26. In an embodiment, the tip hole 26 should not be so large as to easily allow beads to fall out but once the beads are on the hook, they can be removed through the tip hole 26 by applying a small amount of pulling force. In one embodiment, if the orientation of bead is not correct so that the hole in the bead cannot be accessed by the hook, a user can use the hook to access the bead through the slit 25 or the tip hole 26 to turn the bead so it rests in a proper orientation so that the hook can access the hole in the bead through tip hole 26. In another embodiment, the user may use a positioning rod (not shown in FIG. 2) as described below to correctly orient the beads so that they can be accessed through tip hole 26.

The slit 25 goes from a position that is narrow and adjacent attachment point 23, becomes broader as it approaches the tip of the loading access tip 22 to generate tip hole 26, and then becomes narrower at the tip. The slit 25 continues over the tip and stays relatively narrow to a position that is opposite the beginning of the slit (i.e., the slit creates two jaw like appendages that holds the bead in place allowing the bead to be accessed by the hook).

In an embodiment, the invention contemplates using devices to maintain the beads in the correct orientation when they are passing through the storage chamber and arrive at the beading access tip 28. For example, counter-drilled beads may be used and these counter drilled beads may be loaded with the counter-drilled side of the bead hole facing away from the loading access tip 22.

In one embodiment, the proper orientation of one or more beads may be achieved by using a positioning rod, a coil spring and a plastic cap. The positioning rod and coil spring are of a size that allows them to fit in the interior of the storage chamber 11. In one embodiment, the plastic cap is a size that allows it to fit snugly over the storage chamber. In an alternate embodiment, the plastic cap may be of a size that allows the plastic cap to fit in the interior of the storage chamber and also to be attached to the positioning rod. The proper orientation of the beads may be achieved by threading one or more beads on to the positioning rod. The positioning rod with the beads is then inserted into the storage chamber. In one embodiment, the coil spring is then threaded onto the positioning rod behind the beads, followed by the plastic cap. The plastic cap may be pushed onto the positioning rod until it is seated inside the distal end of the storage chamber (it is distal relative to the beading access tip). The seated plastic cap compresses the coil spring which in turn holds the beads under compression in the proper orientation while also providing the necessary force to feed the beads into the beading access tip 28.

To properly mount a bead, a tier holds the device 20 in one hand in a horizontal orientation with the tip hole 26 of the device 20 located in a dorsal position. Next, the fishing hook is held in the other hand with the point of the hook aligned to enter the tip of the device through slit 25. Next, continuing to hold the device in the horizontal orientation the point of the hook is inserted into the slit 25 of the device and through the hole in the bead held by the device 20. The hook point is then rotated downward as the hook point and hook barb exits the bead. The hook point continues to be rotated downward until it is pushed through the slit 25 on the underside of the device as the hook continues to be thread through the bead. At this point the bead, still held by the device, is mounted on the hook past the hook barb with the hook now positioned in the vertical position perpendicular to the device. The bead, which is on the hook, can then be removed through tip hole 26. Removal of the bead on the hook is sometimes facilitated by pushing the hook away from the beading access tip of the device until the bead is aligned with the tip hole in the conical unit of the device while keeping the hook point up towards the front of the device.

The inside diameter of the loading access tip (12, 22), the diameter of the access hole (16), the length and width of the top and bottom longitudinal slits (25), and the diameter of the tip hole 26 are all dictated by the diameter of the bead. The length of the beading access tip 28 is substantially equal to the length of the top and bottom longitudinal slits 25. In one embodiment, it is slightly shorter than the beading access tip 28.

In one embodiment, the storage chamber constitutes the majority of the length of the device. In one embodiment, the storage chamber is made from the same material as the loading access tip. In an embodiment, the storage chamber and the gripping access tip are constructed as one continuous piece from the same piece of stock material or molded in as a single unit. However, the two components may be manufactured separately and joined by means of a threaded joint, chemical bonding agent such as glue or epoxy, or solder.

In an embodiment, the tip ends (e.g., the loading access tip and the beading access tip) may be capped with colored caps, such as colored plastic caps. These color may be color coded and be used to easily identify the size of the beads that are contained in the storage chamber and/or the beads that are to be used/loaded/mounted by the device.

Figure 3A:
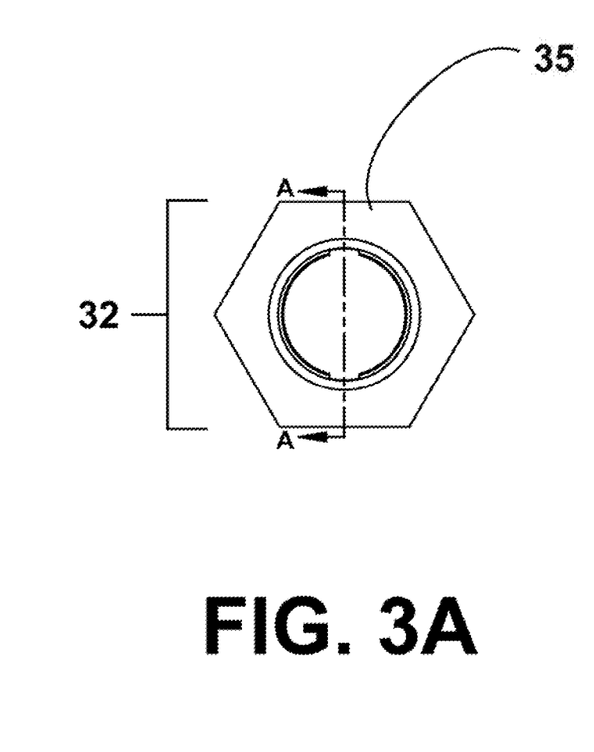
FIG. 3A shows a cross sectional elevation view looking down the length of one of the beading devices of the present invention.
Figure 3B:
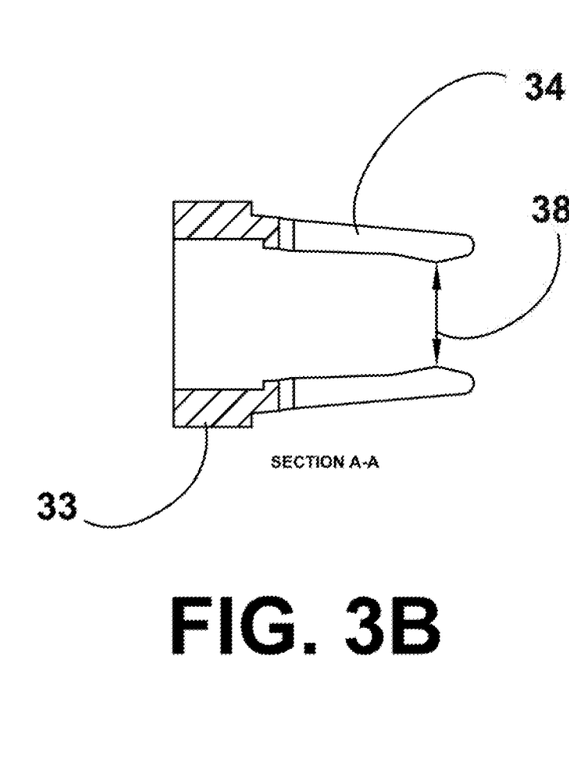
FIG. 3B shows a cross sectional elevation view looking from the side of one of the beading devices of the present invention.

FIGS. 3A and 3B show cross-sectional drawings of the loading access tip 32. FIG. 3B shows the section AA with diameter 38 representing the minimal diameter of the conical unit. Note that diameter 38 is of a size that is slightly smaller than the beads that are to be loaded in the device. When the end of the conical unit is pressed down on a bead with sufficient force, diameter 38 expands to a size that allows the accommodation of the beads into the conical unit past diameter 38 (the slit allows expansion of diameter 38). After passage of the bead from the outside, past diameter 38 and into the conical unit, diameter 38 returns to its size that is slightly smaller than the beads, precluding the beads from falling out of the device.

Figure 4:
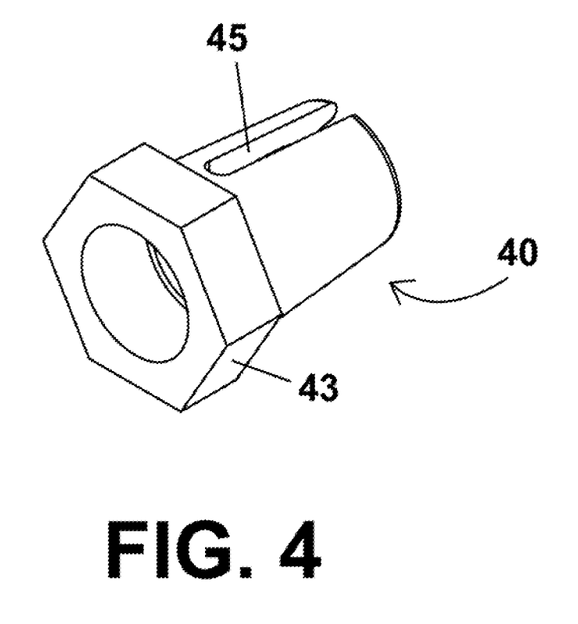
FIG. 4 shows a perspective view of one of the caps of the beading devices.

FIG. 4 shows another perspective view of the loading access tip 40, with slit 45 and with attachment point 43. It should be noted that once beads have been loaded into the device, the device can be used as a storage container until the beads it contains are needed; at which point one simply accesses the beads as described above.

Figure 5:
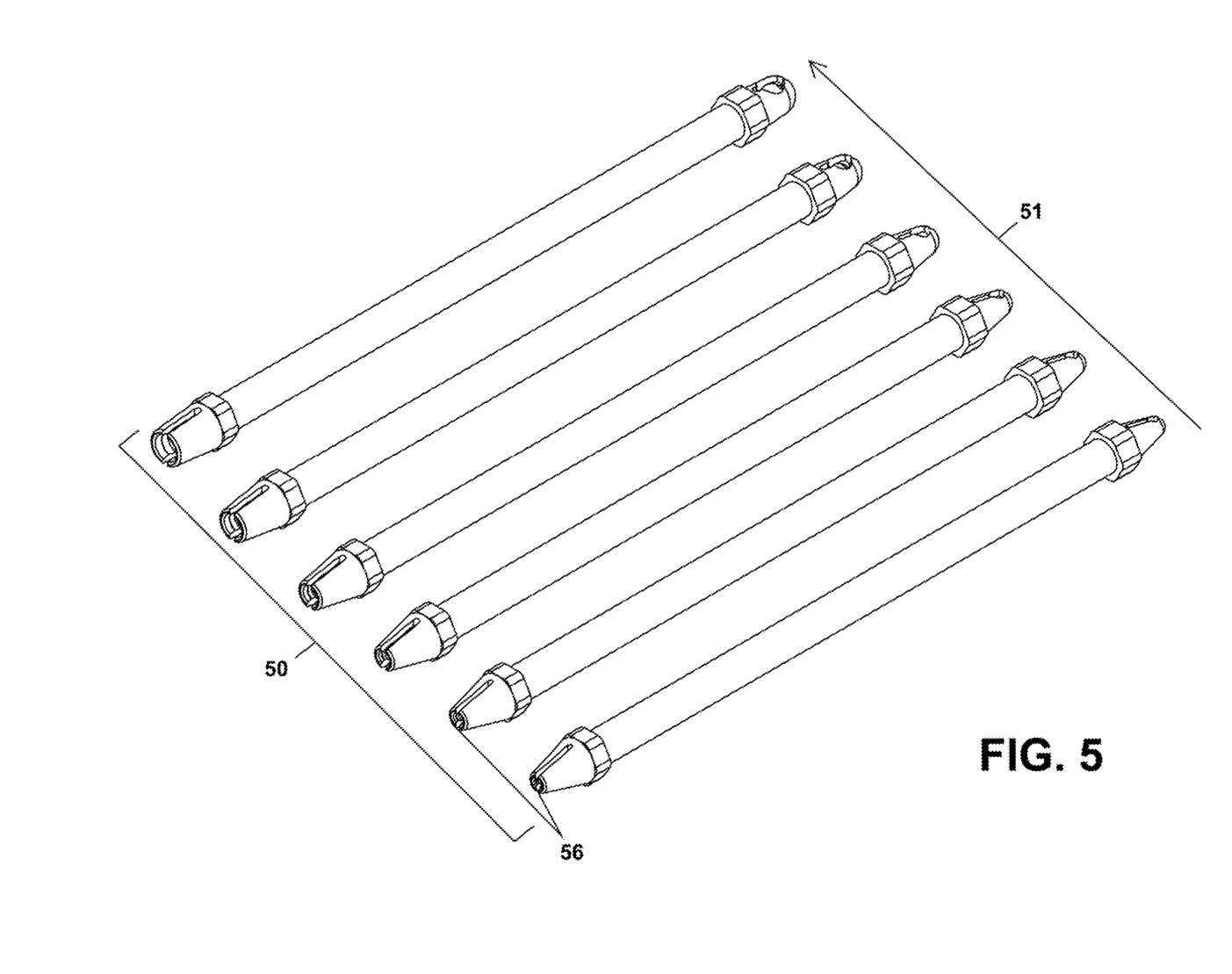
FIG. 5 shows perspective views of one embodiment representing a kit of beading devices of the present invention.

FIG. 5 shows a perspective drawing showing that the device(s) may come as a member of a kit, wherein a plurality of (for example, six) different devices may be included in the kit 50. In an embodiment, each of the plurality of devices may be designed to accommodate different size beads. In FIG. 5, the devices are going from a smaller size device (to accommodate smaller beads) to a larger size device (to accommodate larger beads) as one proceeds in the direction of arrow 51 (from the bottom right of the figure to the top left of the figure). As indicated above, the various tips may be color coded so that a tier can easily ascertain the size of the device that corresponds to the desired bead size to be placed on a hook. Note that loading access hole 56 in each of the devices increase in size in the same direction as arrow 51.

Figure 6A:
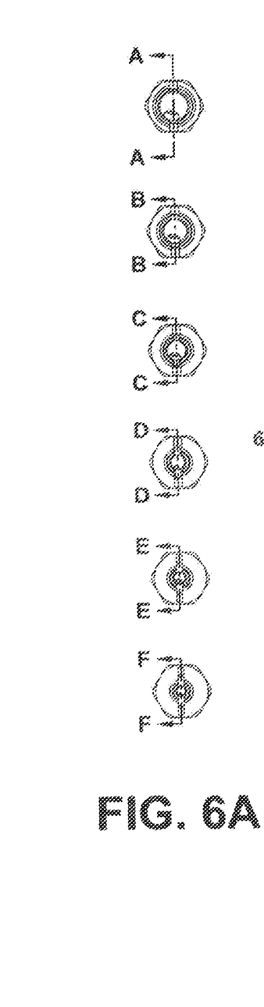
FIG. 6A shows a cross sectional elevation view looking down the lengths of a kit of beading devices of the present invention.
Figure 6B:
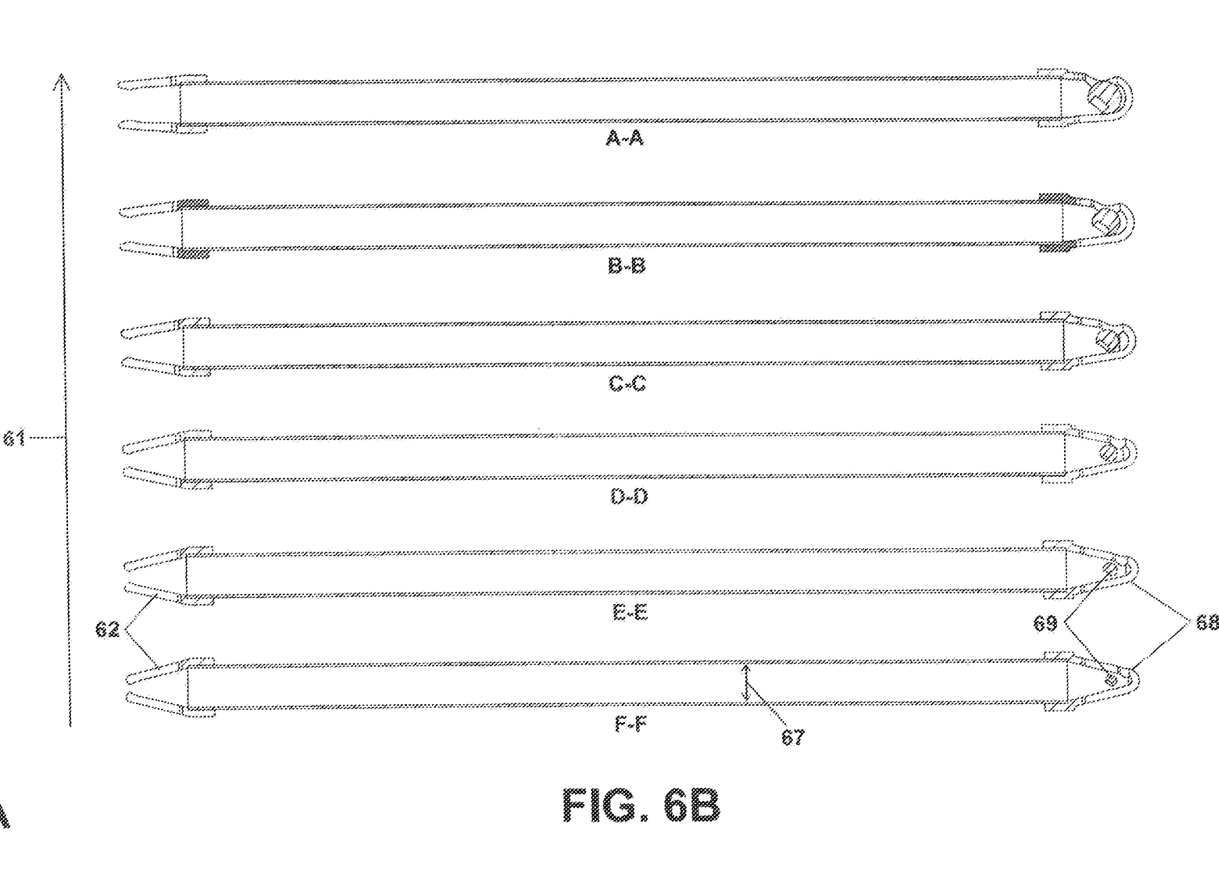
FIG. 6B shows a cross sectional elevation view looking from the side of the beading devices in a kit of beading devices of the present invention.

FIGS. 6A and 6B show elevational views of a kit. FIG. 6A shows an elevational view from an end and 6B shows an elevational view from the side. The devices become bigger as one proceeds in the direction of arrow 61 (from the bottom to the top of the figure) and this can be seen by noting beads 69 in the interior of the various conical units. Although the storage chamber in each of the devices are shown as being roughly the same size in each of the devices that are members of the kit, it should be understood that they may also be different in size (generally, the device that is designed to accommodate the smaller bead will have the smaller storage chamber).

It is contemplated that another embodiment of the invention may have a device that has only one conical shaped tip on it. In one embodiment, the other side distal to the conical shaped tip may be sealed shut. In one embodiment, the one conical shaped tip may be removed and beads poured into the storage chamber (which has a sealed end). The conical shaped tip may have one or more of the various features described above. For example, it may contain a loading access hole, slits, and/or a tip hole that allows the beads to be loaded into the device and/or to be removed as described above.

Accordingly, in an embodiment, the present invention relates to a device that facilitates the loading of one or more beads onto a fishing hook, said device comprising a storage chamber, and one or more of a loading access tip and/or a beading access tip.

In one embodiment, the device comprises a beading access tip. In a variation, the device comprises both a beading access tip and a loading access tip.

In an embodiment, the beading access tip comprises one or more of a slit and/or a tip hole. In a variation, the loading access tip comprises one or more of a slit and/or an access hole.

In an embodiment, the device is made of metal, plastic, rubber, or wood. In a variation, the device may be made of polyethylene, polypropylene, steel, brass, various alloys, various plastics, various metals, various hard rubbers, and/or wood. The device may be manufactured in one piece or combined together after the various pieces are manufactured separately.

In an embodiment, the device comprises a storage chamber, a loading access tip and a beading access tip, wherein loading access tip comprises one or more slits and an access hole, and the beading access tip comprises a slit and a tip hole.

In an embodiment, the beading access tip may be situated so as to rest adjacent a proximal end of the storage chamber and the loading access tip may be situated so as to rest adjacent a distal end of the storage chamber. In a variation, the beading access tip may have a slit that is able to accommodate passage by a hook from a location exterior the beading access tip to a location interior of the beading access tip, and the hook may be able to be inserted into a hole in the one or more beads that are in the interior of the beading access tip.

In an embodiment, the beading access tip may further comprise a tip hole that allows passage of the one or more beads from the location interior of the beading access tip to a location exterior the beading access tip.

In an embodiment, the loading access tip comprises one or more slits and an access hole. In a variation, the diameter of the access hole is a size that is slightly smaller than a diameter of each of the one or more beads. The diameter of the access hole can be flexibly increased by pressure wherein the pressure comes from pushing the access hole down on the bead that the device is designed to accommodate.

In an embodiment, the present invention relates to a kit comprising the device as described above. A plurality of devices may be present in the kit. In one embodiment, the kit comprises six devices. In a variation, each of the six devices is designed to accommodate a different size bead. In a further variation, the six devices may be color coded so that a tier knows what device accommodates what size bead.

In an embodiment, the present invention relates to a method of loading one or more beads on a hook, said method comprising: inserting a bead into an interior of a device comprising a storage device and a beading access tip, wherein said beading access tip has one or more slits that can accommodate passage of said hook through a hole in the bead in the interior of the device.

In a variation, the method may have a device that comprises a beading access tip that further comprises a tip hole that allows passage of said bead from the interior of the device to a position that is exterior to said device.

In a variation, the method may also use a device that further comprises a loading access tip, said loading access tip allowing insertion of one or more beads into the interior of said device.

In a variation, the method may use a device wherein said loading access tip further comprises a slit and an access hole, said access hole having an access hole diameter that is slightly smaller than a diameter of each of the one or more beads.

In a variation, the method may allow passage of the bead from the exterior to the interior of the device by depressing said access hole on a bead, which allows the access hole diameter to expand to a size that is at least the diameter of the bead, allowing passage of the bead from the exterior said device to interior said device.

In an embodiment, the device and the methods of the present invention use beads that have a diameter that is between about $5/64''$ and $3/16''$. In a variation, the beads may be plastic, metal, or ceramic or combinations thereof, or some other material that is waterproof and hard.

Figure 7:
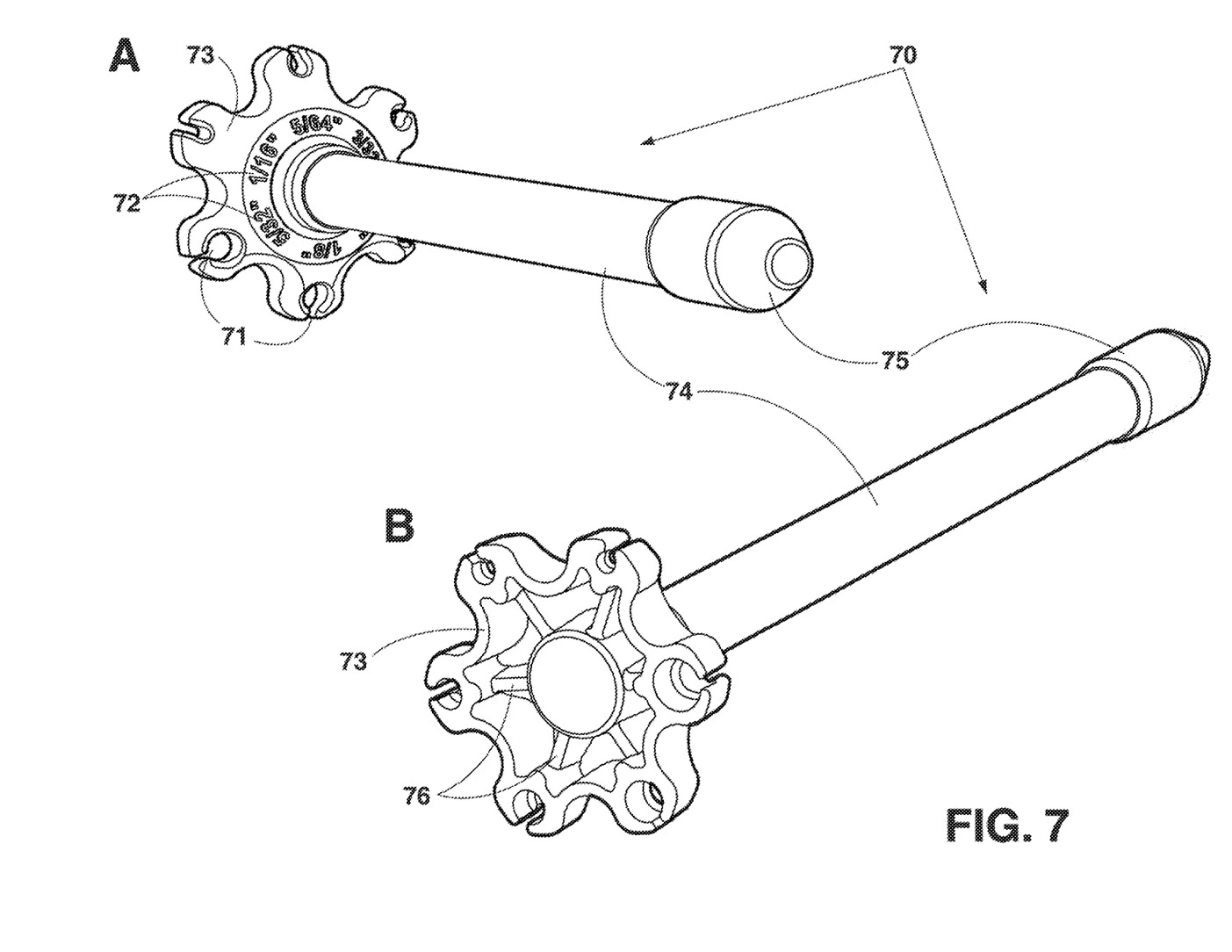
FIGS. 7A and 7B show perspective views of an embodiment of the beading device.

In an embodiment, the beading device 70 is shown in FIGS. 7A and 7B. In this embodiment, the beading device 70 comprises a magnet with a plastic cover 75, a shaft 74 and a hexagonal bead loading implement 73. The hexagonal bead loading implement 73 comprises a plurality of circular bead loading holes 71 that are designed to accommodate a plurality of bead sizes. The hexagonal bead loading implement 73 optionally has a size inscription 72 on the hexagonal bead loading implement 73 that are positioned so as to be in proximity the corresponding circular bead loading holes 71. That is, the circular bead loading hole 71 that is designed to hold a bead of, for example, $1/16''$ in size is adjacent to the size inscription 72 that recites $1/16''$.

In an embodiment, the bottom of the beading device (as shown in FIG. 7B) may have radial spokes 76 that provide stability to the hexagonal bead loading implement 73 when beads are loaded on to the beading device 70.

In an embodiment, the beading device 70 works as follows. Metal beads are placed on a flat surface. The magnet 75 is useful for collecting any metal beads, which may have strayed to a location that is not conducive to mounting the beads on to a fishing hook. The shaft 74 is useful as this is the part of the beading device 70 that is held when beads are collected (e.g., when using the magnet 75) and/or loaded. While the beads are on a flat surface, one positions the appropriately sized circular bead loading hole above the bead to be picked up. For example, if a $1/16''$ bead is on the flat surface, the $1/16''$ bead loading hole 71 that is designed to pick up the $1/16''$ bead is positioned above the $1/16''$ bead. The beading device 70 is held in a position wherein the shaft 74 is perpendicular to the flat surface containing the $1/16''$ bead. The $1/16''$ bead loading hole 71 is designed so that when the $1/16''$ bead loading hole 71 is depressed down on the $1/16''$ bead, the bead is held in the $1/16''$ bead loading hole 71. That is, the bead loading hole 71 has some flexibility so that when there is no bead present in the bead loading hole 71, it is slightly smaller than $1/16''$ in size. However, the act of depressing the $1/16''$ bead loading hole 71 on to the $1/16''$ bead expands the $1/16''$ bead loading hole 71 to a size that allows the $1/16''$ bead to enter into the hole. After the $1/16''$ bead is in the $1/16''$ bead loading hole 71, the $1/16''$ bead remains in the $1/16''$ bead loading hole 71. In one variation, there may be two lips (not shown in FIGS. 7A and 7B) associated with the bead loading holes 71 that allow the bead to stay in place once the bead has been loaded into the bead loading hole 71. These lips should be positioned so that one prevents the bead from escaping the bead loading hole from the top direction (as shown in FIG. 7A) and the other lip prevents the bead from escaping from the bottom direction (as shown in FIG. 7B). In a variation, there may be only one lip which is positioned at the very bottom of the bead loading hole 71 so that the bead cannot escape from the bottom direction. In a variation, the bead loading holes 71 may be tapered so that the hole sizes (e.g., the diameter) at the top of the bead loading holes 71 (the top is shown in FIG. 7A) is smaller at the top and larger at the bottom of the bead loading hole 71 (the bottom is shown in FIG. 7B). The diameter size of the bead loading hole at the bottom may be slightly larger than the bead that the hole is designed to pick up and slightly smaller than the bead at the top of the bead loading hole. This allows entry of the bead from the bottom of the bead loading hole while precluding escape from the top. In one variation, the tapered bead loading hole also contains the bottom lip which when the bead is in position in the bead loading hole 71 it can neither escape (without applying force) from the top nor the bottom of the bead loading hole 71.

In an embodiment, once a bead is in the bead loading hole 71, the bead can be positioned so as to allow a hook to traverse the hole in the bead thus loading the bead on to the hook. Once the bead is on the hook, by exerting pressure on the hooked bead, one can pull the bead out of the bottom of the bead loading hole 71. The process can be repeated until a desired number and desired size(s) of beads is/are placed on the hook(s).

It should be noted that in an embodiment, the bead loading holes have a slit associated with them at the very outer radius of the hexagonal bead loading implement 73 (shown in both FIGS. 7A and 7B but not numbered) that allow slight expansion (when a bead is loaded in the bead loading hole) or contraction (when the bead loading hole is empty) of the bead loading hole, thus accommodating the facile loading of beads into the bead loading holes and unloading of the beads once they are on a hook.

Figure 8:
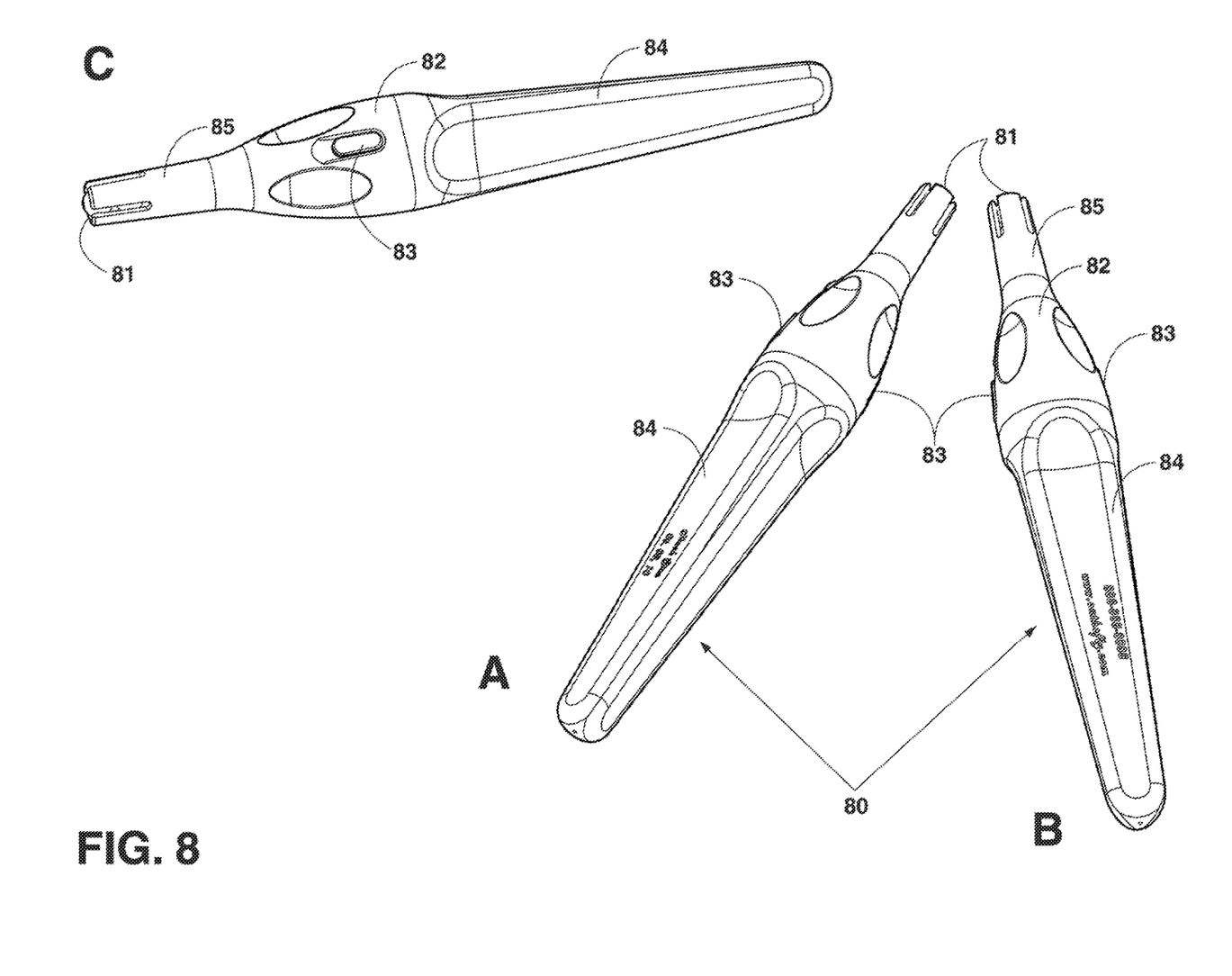
FIGS. 8A, 8B, and 8C show perspective views of another embodiment of the beading device.

FIGS. 8A, 8B, and 8C show another embodiment of the present invention. Handle 84 is used by the user to hold device 80. The beads can either be loaded through beading access/loading tip 81 or may alternately be contained within bead compartment 82. Beading access/loading tip 81 is designed so that it is slightly smaller in size then the bead that one will load on the fishing hook. In an embodiment, there may be a plurality of bead compartments 82 that can be loaded onto handle 84, with each bead compartment containing an appropriately sized beading access/loading tip 81 that is designed for the particular size bead that is to be loaded onto the hook. Button 83 (best seen in FIGS. 8A and 9B) can be depressed which allows removal of bead compartment 82 and replacement with another appropriately sized beading access/loading tip 81 (for the size bead that is to be loaded onto the hook). In one embodiment, button 83 is designed so that it functions like a snap fit (wherein the button is functionally connected to handle 84) allowing removal of bead compartment 83). It should be noted that beading access/loading tip 81 has slits lengthwise along the beading access/loading tip 81 that allows a slight expansion of the diameter of the beading access/loading tip 81. That way, if beads are on a flat surface, one can position the device 80 in a vertical manner with the beading access/loading tip 81 in the down position that allows one to depress the beading access/loading tip 81 on to the bead to be picked up. The pressure on the bead allows the diameter of the beading access/loading tip 81 to expand (because the slits are present) to a size that is slightly larger than the bead to be picked up, allowing one to pick up the desired bead. When holding the device 80 in a vertical manner in an orientation that has the beading access/loading tip 81 closer to the surface, the beads in the device 80 will not come through the beading access/loading tip 81 without the application of pressure on the bead contained therein. The slits in beading access/loading tip 81 allow the bead to be accessed from the side of the bead allowing a user to place the hook through the bead in the beading access/loading tip 81. Pulling on the bead that is contained on the hook allows one to remove the bead from the beading access/loading tip 81. It should be noted that bead compartment 82 may contain a plurality of beads of the same size (which can be accessed by the hook though the slits on the beading access/loading tip 81. The beads can either be picked up as explained above (by depressing the beading access/loading tip 81 on the appropriately sized bead), or may be present in the bead compartment 82 prior to placing the appropriate bead compartment 82 is loaded onto the handle 84. If the latter method is used, positioning the device in a vertical orientation (with the handle up and the beading access/loading tip 81 down) allows the beads to enter the beading access/loading tip 81 by gravity, allowing access of the beads by a hook through the slits in the beading access/loading tip 81.

Thus, it should be understood through the various embodiments disclosed that all of the embodiments have a bead loading tip that allow one to pick up beads of different sizes. All of the embodiments also have a means of accessing the beads in the various devices with a hook allowing easier access to the beads and therefore more rapid loading of beads relative to other ways of placing beads on hooks. The size of the various bead loading tips allow for a user to hold the bead in the desired orientation without the beads falling out of the devices. Applying a small amount of pulling pressure on the hook in each of the devices also allows for easy removal of beads. All of the disclosed embodiments (either separately or as parts of kits) allow for a user to pick up, hold, orient, place the beads on hooks and/or remove beads of various sizes from the devices.

It should be understood that it is contemplated and therefore within the scope of the present invention that any embodiment described above and features enumerated therewith can be combined with any other embodiment and the features discussed with that embodiment. For example, the features that are disclosed as methods may be interchanged with any or all of the features that are disclosed as parts of systems. Moreover, any feature that is described with one embodiment may be incorporated and/or modified so that it is a part of another embodiment. It is contemplated and therefore within the scope of the invention to include reasonable modifications to the embodiments described above without departing from the spirit and scope of the invention. In any event, the present invention is to be described by the below claims.

We claim:

1. A device that facilitates the loading of one or more beads onto a fishing hook, said device comprising a loading access tip, a bead loading hole, a beading access tip, and a storage chamber, wherein said beading access tip has one or more slits that accommodate passage of said fishing hook through a hole in said one or more beads, wherein said loading access tip allows insertion of the one or more beads into the interior of said device, wherein said loading access tip further comprises at least one slit and an access hole, said access hole having an access hole diameter that is slightly smaller than a diameter of each of the one or more beads, and said access hole diameter can expand to a size that is at least the diameter of the bead, allowing passage of the one or more beads from an exterior of said device to the interior of said device.

2. The device of claim 1, further comprising a magnet.

3. The device of claim 1, wherein said beading access tip, and said bead loading hole have a diameter that expands to release the bead.

4. The device of claim 3, wherein said loading access tip is screwed on to said storage chamber.

5. The device of claim 3, wherein the beading access tip is screwed on to said storage chamber.

6. The device of claim 1, wherein said device is made of either metal, plastic, rubber, or wood.

7. The device of claim 6, wherein said device is made of plastic.

8. The device of claim 7, wherein the beading access tip is situated adjacent a proximal end of the storage chamber and the loading access tip being situated adjacent a distal end of the storage chamber.

9. The device of claim 5, wherein said beading access tip further comprises a tip hole that allows passage of said one or more beads from a location interior of the beading access tip to a location exterior of the beading access tip.

10. The device of claim 1, wherein the diameter of said access hole can be flexibly increased by pressure.

11. A method of loading one or more beads on a fishing hook, said method comprising: inserting a bead into an interior of a device comprising a storage device and a beading access tip, wherein said beading access tip has one or more slits that accommodate passage of said fishing hook through a hole in the bead in the interior of the device wherein said device further comprises a loading access tip, said loading access tip allowing insertion of one or more beads into the interior of said device, wherein said loading access tip further comprises a slit and an access hole, said access hole having an access hole diameter that is slightly smaller than a diameter of each of the one or more beads, and said access hole diameter can expand to a size that is at least the diameter of the bead, allowing passage of the bead from the exterior of said device to the interior of said device.

12. The method of claim 11, wherein said beading access tip further comprises a tip hole that allows passage of said bead from the interior of the device to a position that is exterior said device.

13. The method of claim 12, wherein the beads have a diameter that is between about 5/64" and 3/16".

14. The method of claim 12, wherein the tip hole is present in a conical unit, and removal of the bead on the fishing hook is facilitated by pushing the fishing hook away from the beading access tip of the device until the bead is aligned with the tip hole in the conical unit of the device while keeping the fishing hook point up towards a front of the device.

* * * * *